United States Patent
Kim et al.

(10) Patent No.: US 12,252,001 B2
(45) Date of Patent: Mar. 18, 2025

(54) BATTERY CASE FOR ELECTRIC VEHICLE

(71) Applicants: HYUNDAI MOTOR COMPANY, Seoul (KR); Kia Corporation, Seoul (KR)

(72) Inventors: Tae Hyuck Kim, Asan-si (KR); Jong Wook Lee, Hwaseong-si (KR); In Gook Son, Incheon (KR); Yun Ho Kim, Suwon-si (KR); Hyeon Jun Kim, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 303 days.

(21) Appl. No.: 17/867,003

(22) Filed: Jul. 18, 2022

(65) Prior Publication Data
US 2023/0027629 A1 Jan. 26, 2023

(30) Foreign Application Priority Data

Jul. 21, 2021 (KR) .................. 10-2021-0095563

(51) Int. Cl.
*B60K 1/04* (2019.01)
*B60L 50/64* (2019.01)
(Continued)

(52) U.S. Cl.
CPC ............... *B60K 1/04* (2013.01); *B60L 50/64* (2019.02); *H01M 50/204* (2021.01);
(Continued)

(58) Field of Classification Search
CPC .... B60K 1/04; B60K 6/28; B60K 2001/0438; B60K 1/00; B60K 2001/005;
(Continued)

(56) References Cited

U.S. PATENT DOCUMENTS 11,299,211 B2 * 4/2022 Matsuda ............... B62D 27/023
11,539,097 B2 * 12/2022 Patscheider ......... H01M 50/291
(Continued)

FOREIGN PATENT DOCUMENTS

EP         1939025 A1 *  7/2008  ............... B60K 1/04
JP     2008183947 A  *  8/2008  ............... B60K 1/04
(Continued)

OTHER PUBLICATIONS

JP-5071538-B2 English Translation (Year: 2012).*
JP-2008183947-A English Translation (Year: 2008).*
KR-102238042-B1 English Translation (Year: 2021).*
EP-1939025-A1 English Translation (Year: 2008).*

*Primary Examiner* — James A Shriver, II
*Assistant Examiner* — Michael T. Walsh
(74) *Attorney, Agent, or Firm* — Morgan, Lewis & Bockius LLP

(57) ABSTRACT

A battery case for an electric vehicle includes a main body in which a loading region is partitioned off for loading a plurality of battery modules, a sidewall frame forming a sidewall edge portion of the main body and extending upwards, the sidewall frame including a curving portion to correspond with a shape of a vehicle body adopting a multi-link trailing-arm suspension structure, and a first support member and a second support member which are configured to extend from the main body in the longitudinal and transverse directions for partitioning of the loading region.

5 Claims, 5 Drawing Sheets

(51) Int. Cl.
*H01M 50/204* (2021.01)
*H01M 50/249* (2021.01)
*B60K 6/28* (2007.10)

(52) U.S. Cl.
CPC ... *H01M 50/249* (2021.01); *B60K 2001/0438* (2013.01); *B60K 6/28* (2013.01); *B60Y 2200/91* (2013.01); *B60Y 2200/92* (2013.01); *B60Y 2400/112* (2013.01); *H01M 2220/20* (2013.01)

(58) Field of Classification Search
CPC .... B60K 2001/0416; B60K 2001/0455; B60K 2001/0433; B60L 50/64; H01M 50/204; H01M 50/249; H01M 2220/20; B60Y 2200/91; B60Y 2200/92; B60Y 2400/112; B60Y 2304/078; Y02E 60/10; B62D 25/20; Y02T 10/70

See application file for complete search history.

(56) References Cited

U.S. PATENT DOCUMENTS

| | | | |
|---|---|---|---|
| 2015/0165926 A1* | 6/2015 | Kim | B60L 58/22 |
| | | | 320/118 |
| 2020/0079168 A1 | 3/2020 | Suzuki et al. | |
| 2022/0149469 A1* | 5/2022 | Kim | H01M 50/249 |
| 2023/0041000 A1* | 2/2023 | Tandon | B62D 25/08 |
| 2024/0010077 A1* | 1/2024 | Perlo | H01M 50/20 |

FOREIGN PATENT DOCUMENTS

| | | | | |
|---|---|---|---|---|
| JP | 4434213 | B2 | 3/2010 | |
| JP | 5071538 | B2 * | 11/2012 | B60K 1/04 |
| JP | 5273237 | B2 | 8/2013 | |
| JP | 5411235 | B2 | 2/2014 | |
| JP | 5549334 | B2 | 7/2014 | |
| KR | 102238042 | B1 * | 4/2021 | |

\* cited by examiner

BATTERY CASE FOR ELECTRIC VEHICLE

CROSS REFERENCE TO RELATED APPLICATION

The present application claims priority to Korean Patent Application No. 10-2021-0095563, filed Jul. 21, 2021, the entire contents of which is incorporated herein for all purposes by this reference.

BACKGROUND OF THE INVENTION

Field of the Invention

The present invention relates to a battery case for an electric vehicle, and more particularly, to an electric vehicle battery case that provides a curved case shape in consideration of a trailing-arm structure which is a type of rear suspension of an electric vehicle, thereby achieving structural standardization and allowing maximum loading of battery modules inside the battery case by loading battery modules in optimal layout.

Description of Related Art

In general, eco-friendly vehicles such as hybrid vehicles, fuel cell electric vehicles, and electric vehicles all use an electric motor to move the vehicle, and are equipped with high voltage battery packs to supply electric power to the electric motor.

These high voltage battery packs include a battery case having an enclosed space therein and a number of battery modules fixedly fitted inside the battery case. There are two ways to install a high voltage battery pack in a vehicle. In the first installation method, which is normally used for high-capacity big-size battery modules, battery modules in a state of being stored inside the battery case are mounted in the lower part of an underfloor panel under a seat.

Installing high-capacity big-size battery modules under a seat, though, requires an upward adjustment of the underfloor panel in order to secure installation space, and as a result reduces the size of the rear legroom and thus degrades rear-seat passenger's habitability conditions. Furthermore, a roof panel is adjusted higher to compensate for reduced indoor space caused by the upward adjustment of the underfloor panel, thus increasing vehicle height and resulting in deteriorating aerodynamic performance.

For the present reason, the first installation method is mainly chosen for a five-door hatchback, a crossover utility vehicle (CUV), or a multi-purpose vehicle (MPV).

The second installation method is mostly selected for a sedan to which luxuriousness and riding comfort is an important factor. To be specific, one small-capacity small-size high voltage battery pack is installed on the underfloor panel under the back seat, and the other relatively higher-capacity and bigger-size high voltage battery pack is installed in a luggage compartment.

Applying the second installation method is advantageous to be applied to a sedan. Since the small-capacity small-size high voltage battery pack is installed on the underfloor panel under the back seat, an upward adjustment of the underfloor panel is not required and resultant drawbacks can be eliminated.

However, there are disadvantages as well. Because the high voltage battery pack is divided into two types according to capacity and size and the two types of battery packs are installed in two separate places (in the lower part of the underfloor panel and in the luggage compartment), problems of excessive manufacturing and installation costs and preparing two cooling systems arise. Furthermore, the two cooling systems results in a reduction in the size of the luggage compartment space, which leads to a drop in commercial value of a vehicle.

Hence, it is important to standardize the shape of a high voltage battery case taking into account all vehicle lineup including CUVs, MPVs, and sedans, so that the high voltage battery pack can be installed in optimal layout.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a battery case for an electric vehicle, the battery case being configured such that, a curved case shape, in consideration of a trailing-arm structure which is a type of rear suspension of an electric vehicle derived from an internal combustion engine model, is provided to achieve structural standardization, and an arrangement of a plurality of support members in the battery case in the longitudinal and transverse directions allows partitioning of a loading region and makes the battery case fixed to a vehicle body, thus securing rigidity and crashworthiness, and at the same time allowing maximum loading of battery modules inside the battery case by loading battery modules in optimal layout.

In various aspects of the present invention, there is provided a battery case for an electric vehicle, the battery case including: a main body in which a loading region is partitioned off for loading a plurality of battery modules; a sidewall frame forming a sidewall edge portion of the main body and extending upwards, the sidewall frame including a curving portion to correspond with a shape of a vehicle body adopting a multi-link trailing-arm suspension structure of the vehicle; and a plurality of first support members and a plurality of second support members that extend along longitudinal and transverse directions of the main body for partitioning of the stacking region, wherein the stacking region of the main body is partitioned into a plurality of sections so that the plurality of first support members are disposed to partition the inside of the main body into first to fourth regions in the longitudinal direction while the plurality of second support members are disposed to partition, again, the first to fourth regions in the traverse direction.

At least one of the second support members is disposed in the fourth region having the curved portion so that the at least one of the second support members is selectively removable from the fourth region.

The first region is partitioned, by the second support member including a pair of second support members disposed therein among the plurality of second support members, into a power relay assembly (PRA) region in a center portion thereof and a first and a second stacking region on opposite sides of the PRA region, wherein each of the first and second stacking regions is configured, with the plurality of battery modules stacked at a rear, to have a relatively low height towards a front considering a legroom in the vehicle body.

The first support members are disposed to have a predetermined height to match a position of a kick-up portion of the vehicle body in partitioning an internal portion of the main body into the third region and the fourth region.

The sidewall frame forms the sidewall edge portion of the main body so that one end portion of the main body having the curved portion is reduced in width selectively depending on a structure of the vehicle body.

According to various exemplary embodiments of the present invention, the battery case for an electric vehicle is configured such that, a curved case shape, considering a trailing-arm structure which is a type of rear suspension of an electric vehicle determined from an internal combustion engine model, is provided to achieve structural standardization.

Furthermore, an arrangement of a plurality of support members in longitudinal and transverse directions allows partitioning of loading region and makes the battery case fixed to a vehicle body, thus securing rigidity and crashworthiness and at the same time allowing maximum loading of battery modules inside the battery case by loading battery modules in optimal layout.

Furthermore, the second support member disposed in the longitudinal direction inside the battery case having curved shape to secure rigidity may be removable, so that the battery modules in the location corresponding to where the second support member is removed may be stacked maximumly.

Furthermore, the battery case is configured such that, in consideration of a legroom space in the first row, the location corresponding to the legroom has a relatively low height, effectively securing the legroom space in the first row and improving comfort.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
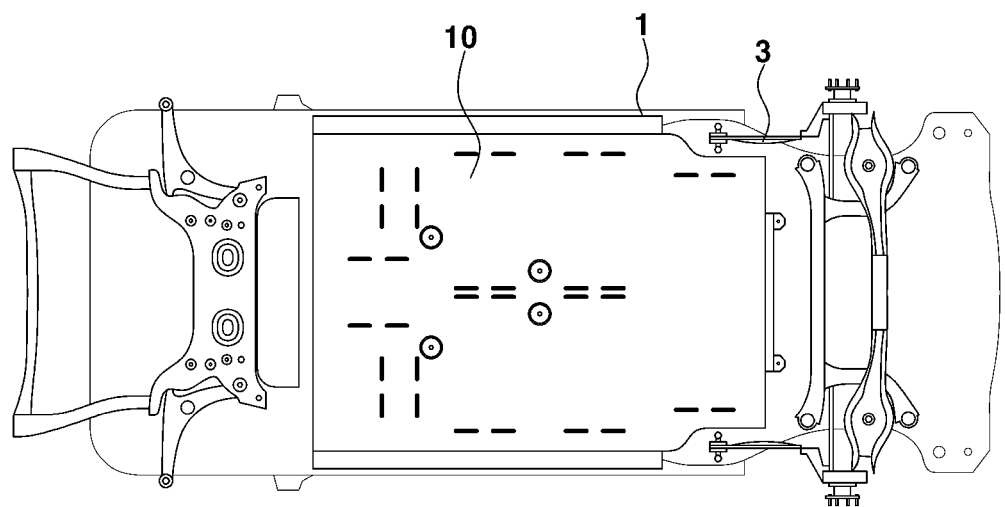
FIG. 1 is a view showing a battery case for an electric vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings.

The merits and characteristics of the present invention and a method for achieving the merits and characteristics will become more apparent from the embodiments described in detail However, the present invention is not limited to the disclosed exemplary embodiments of the present invention, but may be implemented in various different ways. The embodiments are provided only to complete the present invention of the present invention and to allow those skilled in the art to understand the category of the present invention. The present invention is defined by the category of the claims.

In describing the embodiments, a description of contents that are well known in the art to which various exemplary embodiments of the present invention pertains but not directly related to the present invention will be omitted in order to make the gist of the present invention clearer.

Figure 2:
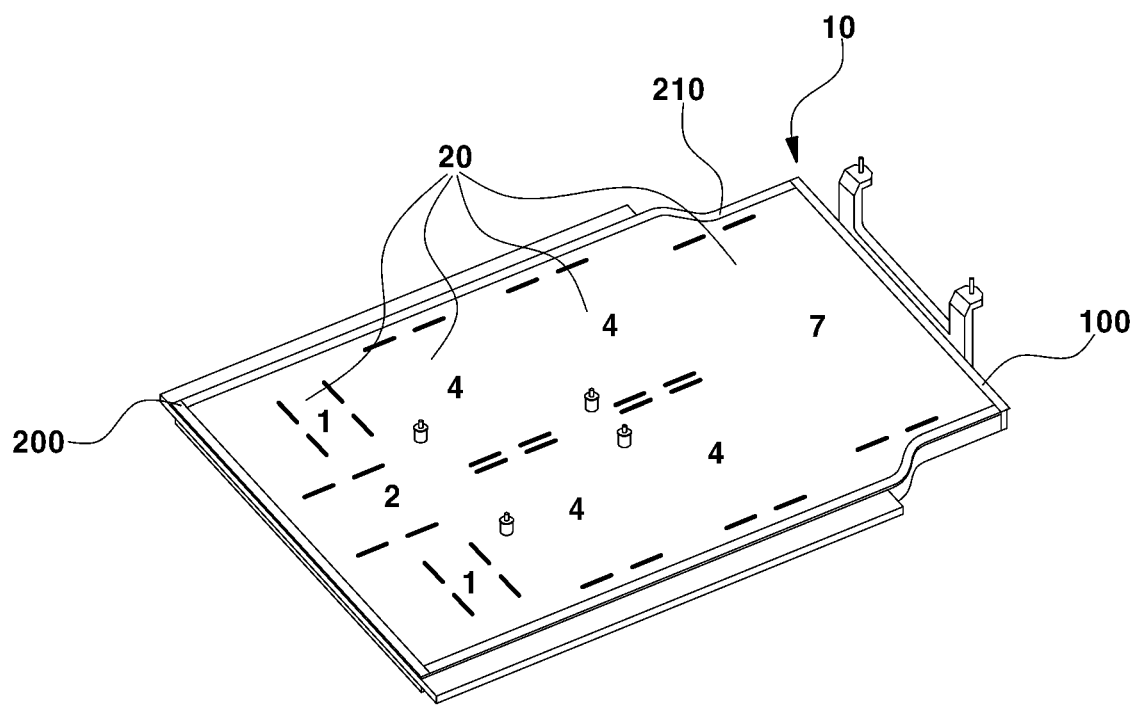
FIG. 2 is a view showing a mounted state of a battery case for an electric vehicle according to various exemplary embodiments of the present invention.
Figure 3:
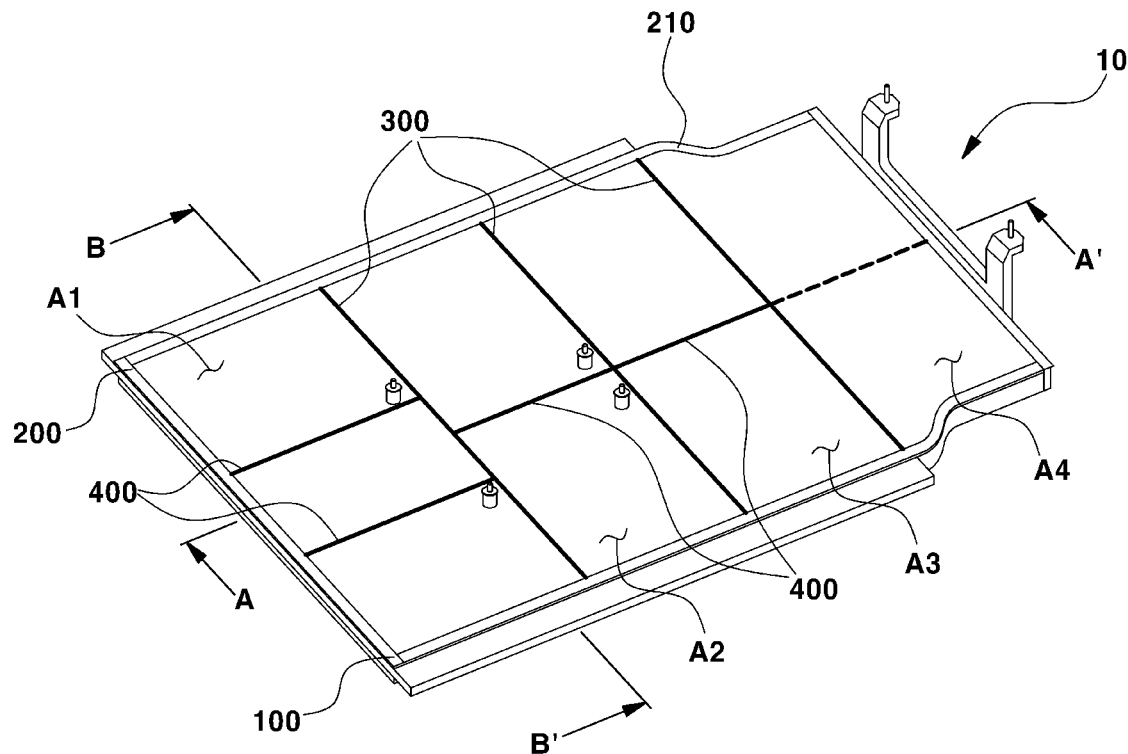
FIG. 3 is a view showing a first support member and a second support member of a battery case for an electric vehicle according to various exemplary embodiments of the present invention.

FIG. 1 is a view showing a battery case for an electric vehicle according to various exemplary embodiments of the present invention, FIG. 2 is a view showing a mounted state of a battery case for an electric vehicle according to various exemplary embodiments of the present invention, and FIG. 3 is a view showing a first support member and a second support member of a battery case for an electric vehicle according to various exemplary embodiments of the present invention.

Figure 4:
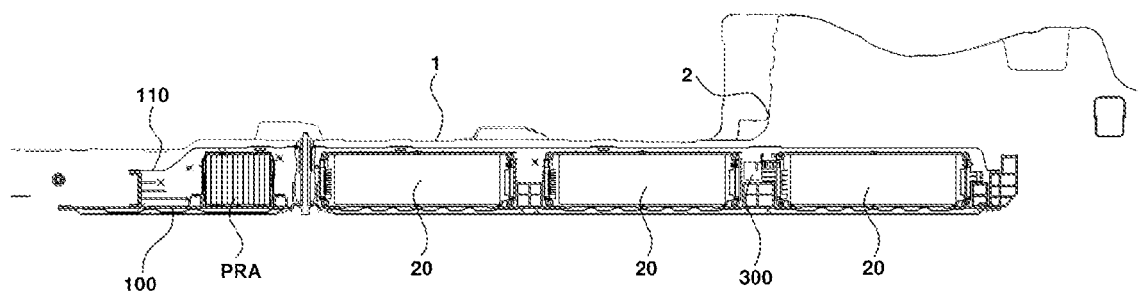
FIG. 4 is a view showing an A-A' structure of FIG. 3 according to various exemplary embodiments of the present invention.
Figure 5:
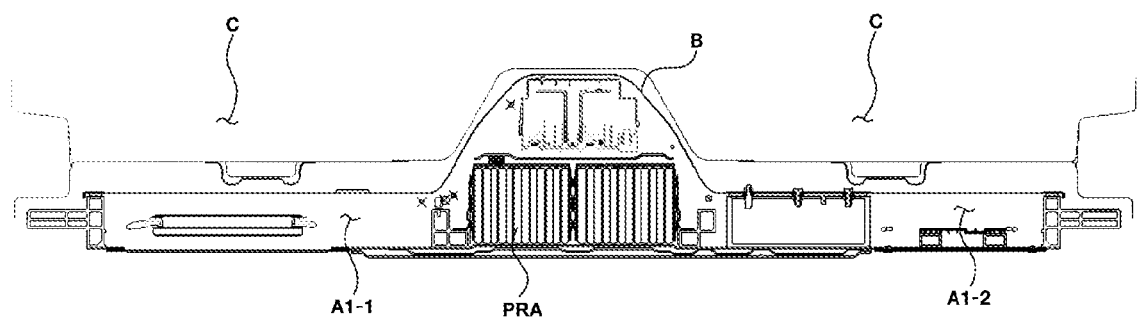
FIG. 5 is a view showing a B-B' structure of FIG. 3 according to various exemplary embodiments of the present invention.
Figure 6A:
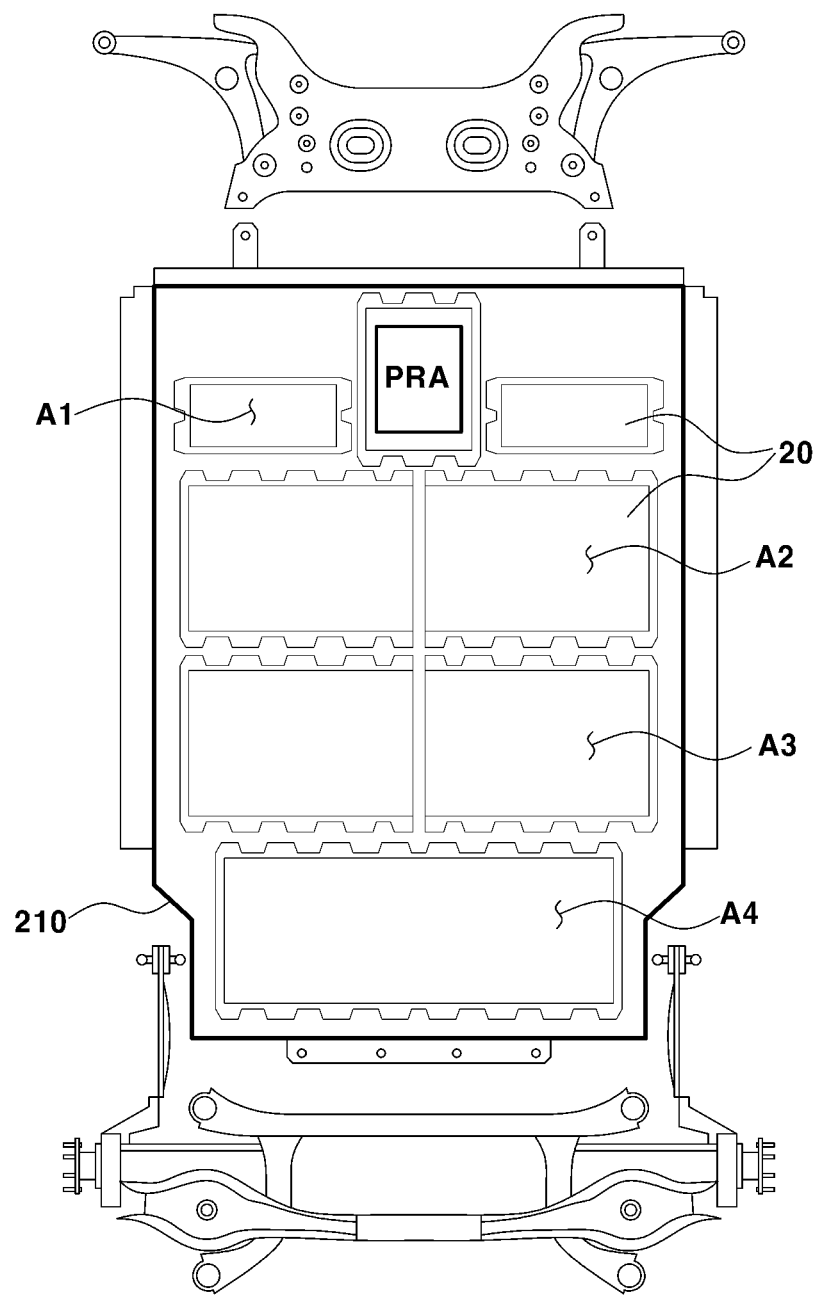
FIG. 6A and FIG. 6B are views showing a structure of a sidewall frame of a battery case for an electric vehicle according to various exemplary embodiments of the present invention.
Figure 6B:
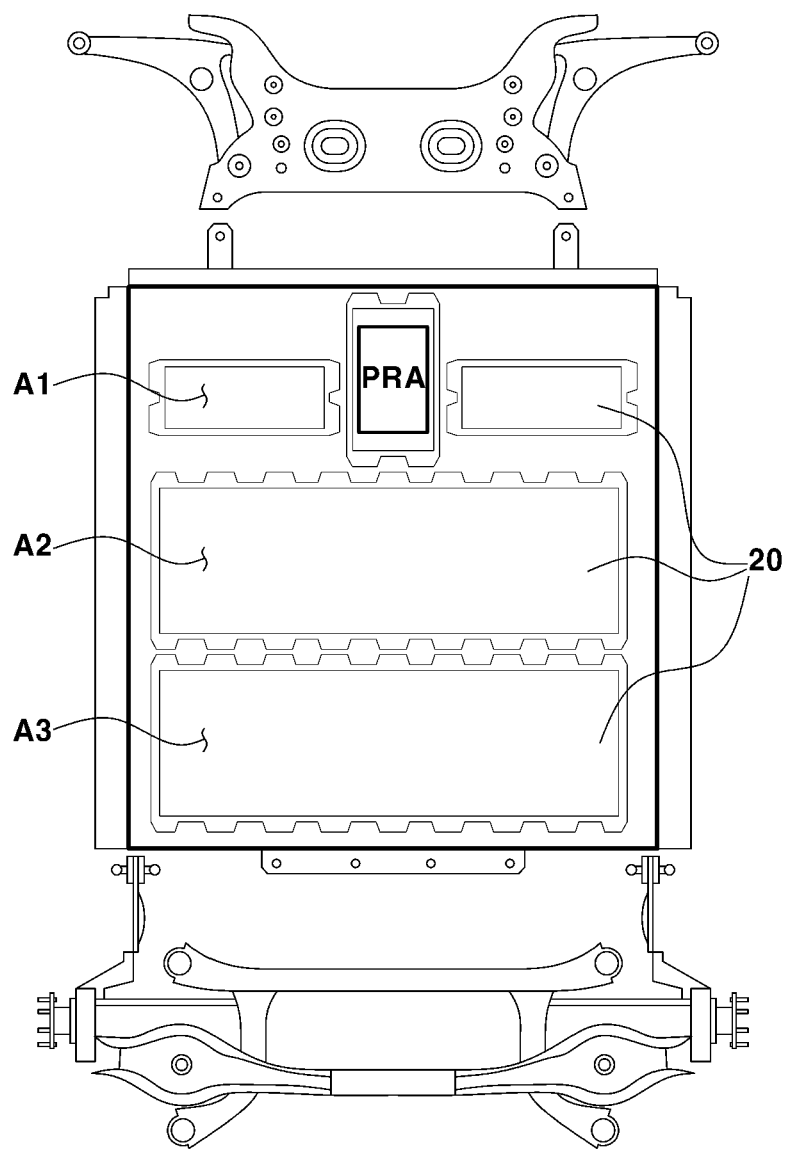

FIG. 4 is a view showing an A-A' structure of FIG. 3 according to various exemplary embodiments of the present invention, FIG. 5 is a view showing a B-B' structure of FIG. 3 according to various exemplary embodiments of the present invention, FIG. 6A and FIG. 6B are views showing a structure of a sidewall frame of a battery case for an electric vehicle according to various exemplary embodiments of the present invention.

As shown in FIG. 1, FIG. 2, and FIG. 3, a battery case for an electric vehicle 10 according to various exemplary embodiments of the present invention includes a main body 100, a sidewall frame 200, a first support member 300, and a second support member 400.

The main body 100 is mounted to a vehicle body 1, and a loading region for loading a plurality of battery modules 20 is partitioned off.

The sidewall frame 200 forms a sidewall edge portion of the main body 100 and extends upwards.

The sidewall frame 200 includes a curving portion 210 to correspond with a shape of the vehicle body 1 adopting the structure of a multi-link trailing-arm suspension 3.

Currently, there are two main types of rear suspension for vehicles built on front-drive platforms: a coupled torsion beam axle (CTBA) and a plate type multi-link trailing-arm.

Electric vehicles derived from internal combustion engine models, or derivative electric vehicles, do not have their own specific platforms, so they basically use an existing type of suspension (a plate type multi-link trailing arm) in order to share many parts including internal and external portions with traditional internal combustion engine vehicles.

Accordingly, an existing type of suspension, namely a plate type trailing arm, needs to be used in derivative electric vehicles as a rear suspension in consideration of the structure applied in the front-drive platforms, and it is essential that the main body 100 and the sidewall frame 200 of the battery case for an electric vehicle may have a corresponding shape and structure.

In terms of securing a space, the fourth region A4 may be formed to the same size and shape as the second region A2 to the third region A3 for effective loading of the battery modules (see FIG. 2). However, this is not applicable in the case of the fourth region A4 due to the structural features of the multi-link trailing arm 3 in a plate type multi-link trailing arm structure as stated above (see FIG. 1). Thus, one side of the main body 100 and the sidewall frame 200 needs to have the curving portion 210 for standardization of the battery case 10 applied to derivative electric vehicles, so that structural constraints associated with application of the plate type multi-link trailing arm 3 may be avoided and the battery modules 20 may be stacked in optimal layout.

The first support member 300 and the second support member 400 are configured to extend from the main body 100 in the longitudinal and transverse directions for partitioning of a loading region.

In other words, the loading region, as shown in FIG. 3, is partitioned into a plurality of sections in the main body by the first support member 300 including a plurality of first support members disposed for partitioning the internal portion of the main body 100 into the first region A1, the second region A2, the third region A3, and the fourth region A4 in the longitudinal direction, and by the second support member 400 including a plurality of second support members disposed for allowing the first region A1 to the fourth region A4 partitioned by the first support member 300 to be partitioned again in the transverse direction.

Here, the second support member 400 is disposed in the fourth region A4 having the curving portion 210 such that the second support member 400 is selectively removable.

The second support member 400 which is for partitioning the fourth region A4 in the transverse direction be installed to secure structural rigidity when a forward collision occurs (see dotted lines in FIG. 3). However, the loading region in the fourth region A4 for loading battery modules is relatively reduced compared to those of the second region A2 to the third region A3 due to the formation of the curving portion 210. Therefore, to compensate this, the second support member 400 disposed in the fourth region A4 needs to be removed so that the loading region may be partitioned in a way to get an optimal layout for loading battery modules 20 in the fourth region A4 having the curving portion 210.

Further as shown in FIG. 3, the first region A1 may be partitioned, by the second support member 400 including a pair of second support members disposed therein, into a power relay assembly (PRA) region B in a center portion thereof and a first loading region A1-1 and a second loading region A1-2 on opposite sides of the PRA region B. The PRA region is provided to connect or disconnect electric power delivered from a battery to or from a motor through a power control unit (PCU) in electric and hybrid vehicles.

Each of the first loading region A1-1 and the second loading region A1-2 is configured, with the plurality of battery modules 20 stacked at a rear (see FIG. 3), as shown in FIGS. 4 to 5, to have a relatively low height towards a front of first loading region A1-1 and the second loading region A1-2 considering a legroom C in the vehicle body.

As shown in FIG. 4, the rear area having battery modules 20 stacked in the first loading region A1-1 and the second loading region A1-2 is a region where a seat of the vehicle body 1 may be positioned in the upper part thereof, so a case part 110 covering the main body 100 is formed flat, whereas the front area is a region corresponding to the legroom of an occupant, thus the case part 110 is configured to form a shape with a predetermined slope and whose height is gradually lowered toward the front, effectively securing the legroom C of the occupant.

Further as shown in FIG. 4, in various exemplary embodiments of the present invention, the first support member 300 may be disposed at a predetermined height to match a position of a kick-up portion 2 of the vehicle body 1 in partitioning the internal portion of the main body 100 into the third region A3 and the fourth region A4 by the first support member 300 including the plurality of first support members.

In other words, as mentioned above, the second support member 400 may be disposed in the fourth region A4 having the curving portion 210 such that the second support member 400 is selectively removable, and as a result structural rigidity may not be secured. However, to offset the present structural problem, the first support member 300 may be fastened to the kick-up portion 2 of the vehicle body 1 by a plurality of fastening members, thus providing a structure which is effective in terms of rigidity and crashworthiness.

Meanwhile, as shown in FIG. 6A and FIG. 6B, the sidewall frame 200 forms a sidewall edge portion of the main body 100 so that one end portion of the main body 100 having the curving portion 210, specifically the fourth region A4 of the loading region, may be reduced selectively depending on the structure of the vehicle body.

That is, to make the battery case 10 applied to a plurality of segments have a different structure and size since the electric vehicles derived from internal combustion engine models have different vehicle body lengths depending on the segment, the battery case 10 according to the exemplary embodiment may be applied effectively to each segment.

As shown in FIG. 6A, a battery case for the vehicle body 1 applied to B, C, or SUV segment may have the same size and structure with the aforementioned battery case 10, while as shown in FIG. 6B, for A segment, namely light vehicle, the first region A1 to the third region A3 may be maintained and the fourth region A4 may be reduced (removed) to fit the size of the vehicle body, thus allowing the standardized battery case 10 to be applied effectively to various vehicle segments.

The sidewall frame 200 can not only make the fourth region A4 reduced (removed) but also make the width and length of the first region A1 to the third region A3 reduced depending on the segment.

For the vehicle body 1 applied to B, C, or SUV segment, the battery modules 20 are arranged in serial order at the front where the PRA is provided, for example in the number of 4-8-8-7 (see FIG. 6A), whereas for the vehicle body 1 applied to A segment, the arrangement of the battery modules 20 follows the same layout as the one used in B, C, or SUV segment in the first region A1 to the third region A3 due to the reduction of the width and length, and the battery modules 20 may be arranged in serial order at the front where the PRA is provided, for example in the number of 3-7-7 (see FIG. 6B).

To sum up, in various exemplary embodiments of the present invention, the structure of the standardized battery case 10 applied to B, C, or SUV segment may be effectively used in the vehicle body 1 for each segment having different body size without a change in the arrangement layout of the battery modules 20 and only with selective reduction of the width and the fourth region A4, and accordingly there is no need to manufacture different battery case 10 for each segment, reducing total number of hours put into production and material cost.

According to various exemplary embodiments of the present invention, the battery case for an electric vehicle is configured such that, a curved case shape, considering a trailing-arm structure which is a type of rear suspension of an electric vehicle derived from an internal combustion engine model, is provided to achieve structural standardization.

Further, an arrangement of a plurality of support members in the battery case in longitudinal and transverse directions allows partitioning of the loading region and makes the battery case fixed to a vehicle body, thus securing rigidity and crashworthiness and at the same time allowing maximum loading of battery modules inside the battery case by loading battery modules in optimal layout.

Furthermore, the second support member arranged in the longitudinal direction inside the battery case having the curved shape to secure rigidity is removable, so that the battery modules in the location corresponding to where the second support member is removed may be stacked maximumly.

Furthermore, the battery case is configured such that, in consideration of a legroom space in the first row, the location corresponding to the legroom has a relatively low height, effectively securing the legroom space in the first row and improving comfort.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A battery case for a vehicle, the battery case comprising:
   a main body in which a loading region is partitioned for loading a plurality of battery modules;
   a sidewall frame forming a sidewall edge portion of the main body and extending upwards, the sidewall frame including a curved portion to correspond with a shape of a vehicle body adopting a multi-link trailing-arm suspension structure of the vehicle; and
   a plurality of first support members and a plurality of second support members that extend respectively along transverse and longitudinal directions of the main body for partitioning of the loading region,
   wherein the loading region of the main body is partitioned into a plurality of sections so that the plurality of first support members is disposed to partition the inside of the main body into a predetermined number of regions in the longitudinal direction while the plurality of second support members is disposed to partition, again, the predetermined number of regions in the traverse direction,
   wherein the predetermined number of regions includes a first region, a second region, a third region and a fourth region,
   wherein the first region is partitioned, by the second support member including a pair of second support members disposed therein among the plurality of second support members, into a power relay assembly (PRA) region in a center portion thereof and a first loading region and a second loading region on opposite sides of the PRA region, and
   wherein a rear area having the battery modules stacked in the first loading region and the second loading region is a region where a seat of the vehicle body is configured to be positioned in an upper part thereof, so that a case part covering the main body is formed flat, and a front area thereof is a region corresponding to a legroom, so that the case part is configured to form a shape with a predetermined slope and whose height is lowered toward a front thereof.

2. The battery case of claim 1, wherein at least one of the second support members is disposed in the fourth region having the curved portion so that the at least one of the second support members is selectively removable from the fourth region.

3. The battery case of claim 1, wherein each of the first loading region and the second loading region is configured, with the plurality of battery modules stacked at a rear, to have a relatively low height towards a front considering the legroom in the vehicle body.

4. The battery case of claim 1, wherein the first support members are disposed to have a predetermined height to match a position of a kick-up portion of the vehicle body in partitioning an internal portion of the main body into the third region and the fourth region.

5. The battery case of claim 1, wherein the sidewall frame forms the sidewall edge portion of the main body so that one end portion of the main body having the curved portion is reduced in width selectively depending on a structure of the vehicle body.

* * * * *